Sept. 1, 1959  L. T. ROSENBERG  2,902,611
SUPERCHARGED FINGER PLATES
Filed Nov. 15, 1957  2 Sheets-Sheet 1

Inventor
Leon T. Rosenberg
by R. Edward Foerch, Jr.
Attorney

Sept. 1, 1959
L. T. ROSENBERG
2,902,611
SUPERCHARGED FINGER PLATES
Filed Nov. 15, 1957
2 Sheets-Sheet 2
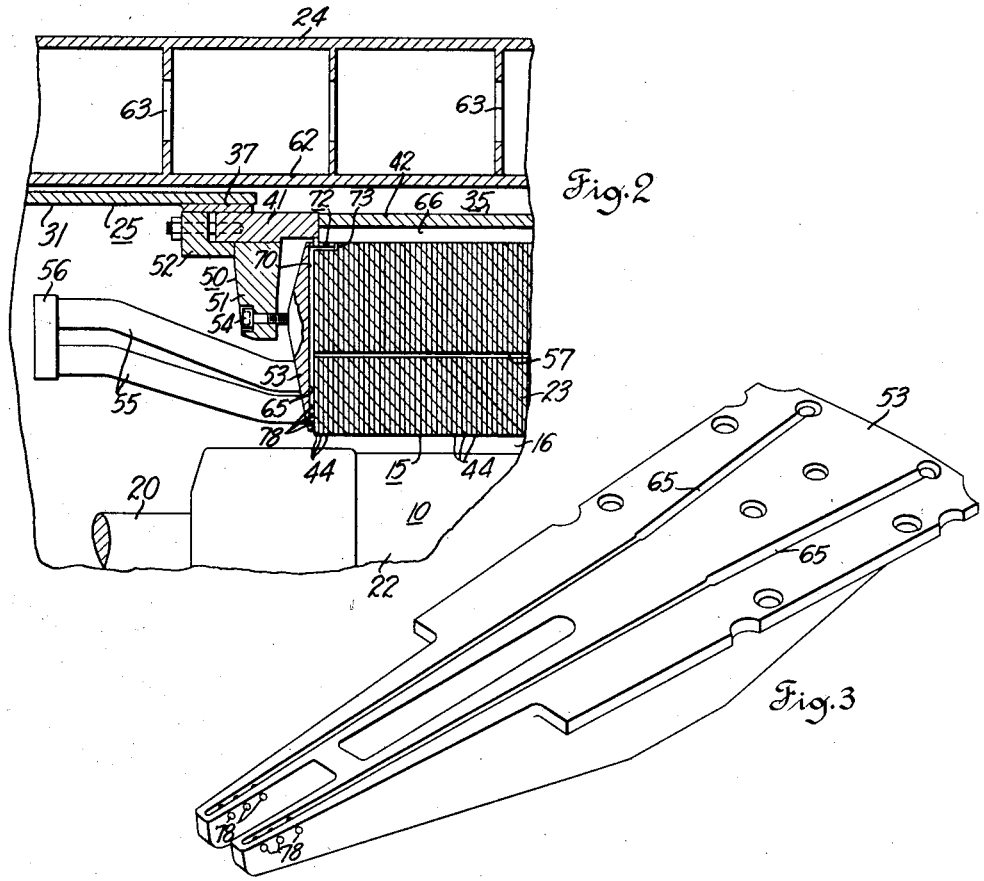
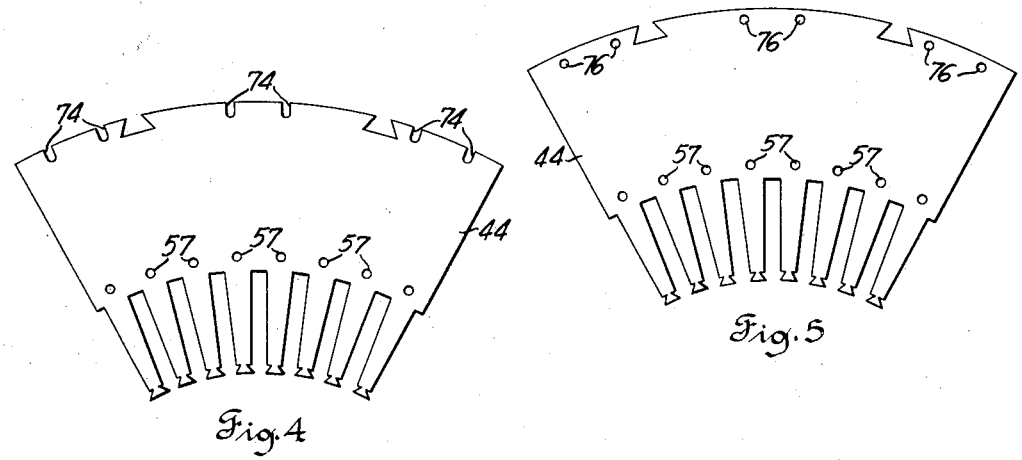
Inventor
Leon T. Rosenberg
By H. Edward Finch Jr.
Attorney United States Patent Office 2,902,611
Patented Sept. 1, 1959

2,902,611

SUPERCHARGED FINGER PLATES

Leon T. Rosenberg, Wauwatosa, Wis., assignor to Allis-Chalmers Manufacturing Company, Milwaukee, Wis.

Application November 15, 1957, Serial No. 696,685

4 Claims. (Cl. 310—64)

This invention relates to a cooling arrangement for dynamoelectric machines. More particularly, this invention relates to a cooling arrangement for finger plates which clamp the stator core laminations at the gas discharge end of conductor cooled dynamoelectric machines having end to end cooling.

In conductor cooled dynamoelectric machines, cooling gas is passed through ducts inside of the winding insulation to provide substantially direct contact between the cooling gas and the winding conductors for removing the conductor heat losses. Additional ducts are also provided extending axially through the stator core for removing the core heat losses. In order to conserve as much of the gas flow as possible for the stator windings and to insure that the core remains as near as possible to the winding copper temperature at maximum loads and gas pressures, the stator core ventilation ducts are kept as small as possible, being only barely adequate for one-half pound hydrogen pressure requirements which are most critical for the core. Under this condition the gas discharge end of the core with end to end cooling will become quite hot, perhaps to the limit that the insulation can withstand. The heat losses caused by eddy currents in the end laminations and in the finger plates which clamp the stator core laminations at the gas discharge end of the machine are very difficult to remove under these conditions using the gas flowing through the core ducts since the core gas is already up to its maximum temperature.

According to the present invention a special cooling duct system is provided for the finger plates at the gas discharge end of the machine. The special cooling system comprises radially extending grooves in the flat surface of the finger plates that contact the end lamination of the stator core. Cooling gas is forced at high velocity from the outer periphery of the machine radially inward toward the air gap through ducts formed by the grooves and the end lamination of the stator core. Thus, the clamping fingers as well as the end laminations are cooled by a direct contact with fast moving gas similar to that flowing through the windings.

Another feature of the present invention is the means supplying the cooling gas to the finger plate ducts. These means comprise an annular supply duct between the stator core and the inner housing wrapper receiving cooling gas at the high gas pressure end of the machine and supplying the gas to special stator core ducts provided at the other end of the core. The special stator core ducts connect the supply duct with the finger plate ducts and are formed by a series of special slots and holes in adjacent stator core laminations. After flowing radially inward through the finger plate ducts, the gas discharges circumferentially through ducts at the radially inner end of the finger plate to the low gas pressure end of the machine.

The discharge ducts are arranged to discharge circumferentially to prevent interference with gas discharging from the air gap, and the discharge ducts in adjacent finger plates are staggered to prevent interference of the gas from the adjacent finger plates with each other.

It is, therefore, an object of the present invention to provide an improved cooling arrangement for dynamoelectric machines.

Another object of the present invention is to provide a cooling arrangement for finger plates which clamp the stator core laminations at the gas discharge end of conductor cooled dynamoelectric machines having end to end cooling of the stator winding.

Another object of the present invention is to provide a special supply of cool gas for cooling the finger plates at the gas discharge end of conductor cooled dynamoelectric machines having end to end cooling of the stator winding.

Other objects and advantages will be apparent to one skilled in the art from the following description taken with the accompanying drawings, in which the different figures are drawn on different scales. In the drawings:

Fig. 2 is an enlarged sectional view of the end portion of the stator core of Fig. 1 showing the special duct supplying cooling gas to the cooling duct of the finger plate;

Fig. 3 is a perspective view of a finger plate having the radially extending groove arranged in accordance with the present invention;

Fig. 4 is a view showing the slots in core laminations forming the radial portion of the ducts supplying cooling gas to the finger plate cooling duct;

Fig. 5 is a view showing holes in core laminations forming the axial portion of the ducts supplying cooling gas to the finger plate cooling duct;

Figure 1:
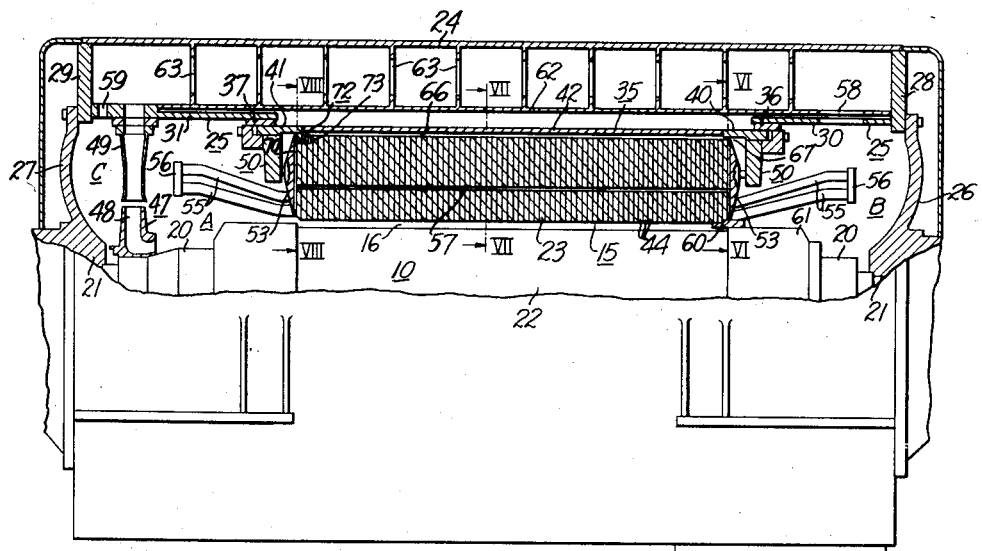
Fig. 1 is a partial sectional view of a dynamoelectric machine embodying the present invention.

Referring to the drawings, a totally enclosed dynamoelectric machine such as the turbogenerator shown in Fig. 1 comprises a rotating field member or rotor 10 mounted on or integral with a rotatable shaft 20 supported in suitable bearings 21. The rotor comprises a slotted magnetic core 22 provided with a field winding (not shown). The bearings 21 support the rotor core 22 in coaxial relation with a stator 15 and an air gap 16 is formed therebetween.

The stator 15 comprises a slotted laminated core 23 mounted in a stationary support. The stationary support comprises an outer wrapper 24 and an inner wrapper 25. End bells 26 and 27 and radial annular support plates 28 and 29 are secured to the ends of the outer wrapper 24. The central portions of the end bells 26, 27 are provided with suitable shaft seals (not shown). The end bells 26, 27, the radial annular support plates 28, 29 and the outer wrapper 24 form a totally enclosed housing for the machine which is normally filled with a light density gas such as hydrogen. The gas may have an average pressure equal to atmospheric pressure, but may have an average pressure of any suitable value, such as thirty pounds per square inch above atmospheric.

The inner wrapper 25 comprises cylindrical end members 30 and 31 secured to the radial annular support plates 28 and 29, respectively, as by welding. Inner wrapper 25 further comprises a cylindrical member 35 offset radially inward of cylinders 30 and 31. Cylinder 35 comprises portions 40 and 41 at opposite ends thereof and intermediate member 42. Cylinder 35 is rigidly attached to cylinders 30 and 31 by means of annular members 36 and 37 which are welded to the axially inner end of members 30 and 31 and to the axially outer ends of portions 40 and 41.

Figure 8:
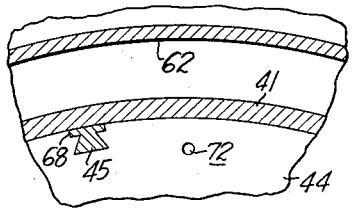
Fig. 8 is a sectional view taken along line VIII—VIII of Fig. 1.
Figure 7:
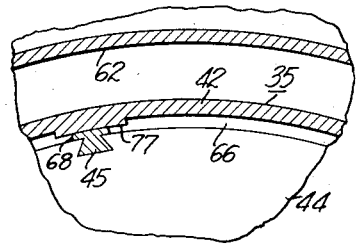
Fig. 7 is a sectional view taken along line VII—VII of Fig. 1.
Figure 6:
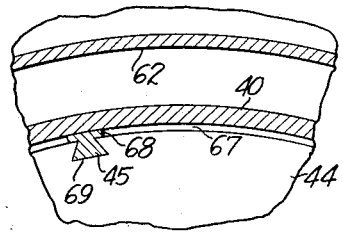
Fig. 6 is a sectional view taken along line VI—VI of Fig. 1.

Core stacking bars 45, as seen in Figs. 6, 7 and 8, extend axially of member 35 and are spaced around the inner circumference thereof. Intermediate member 42 of cylinder 35 is provided with lands 77, Fig. 7, at the points it is desired to fasten stacking bars 45. In this manner the amount of machining required for accurately positioning core stacking bars 45 on the inner liner 35 is greatly reduced.

Referring to Fig. 2, stator core laminations 44 of stator core 23 are stacked on the core stacking bars 45. The core laminations 44 are clamped together in their assembled position by clamping means 50 which comprise a spring disk 51 upon which tension is applied by means of clamps 52 which are bolted to the end portions 40 and 41 of the inner wrapper 35. The clamping means 50 further comprise finger plates 53 which extend from the outer periphery of the core to approximately the radial inner end of the core 23. The finger plates 53 are fastened to the radially inner end of the disk spring by means of bolts 54 which apply the clamping force to approximately the center of finger plates 53.

Axially extending armature winding 55 of stator core 15 may comprise any suitable ventilated conductors in which the ventilating gas has direct contact or substantially direct contact with the metal conductors, but preferably comprises stranded conductors (not shown) stacked in two rows and spaced by a plurality of high resistivity tubes which extend in a row longitudinally of the conductors in a conventional manner. To reduce eddy currents in the conductors, the strands are preferably coated with insulated material and transposed. The end connection joining two conductors extending in different slots comprises a copper clip 56, shown in Fig. 2, which envelops the spaced end portions of the two conductors. Ventilating gas enters the tube openings at the end of the winding 55 and passes through the tubes in good heat conducting relation to the strands of the conductors from one end of the machine indicated as area "B" to the other end of the machine indicated as area "A."

The stator core 15 is also provided with axially ventilating ducts 57 comprising aligned holes in the laminations 44 forming ducts 57 which open to the ends of the core between clamping fingers 53 and adjacent to core slots containing stator windings 55. These ducts 57 are relatively small in transverse cross section so they pass only a limited proportion of the stator ventilating gas between the ends of the machine. The sizes of the stator ducts 57 and the ducts formed by the tubes cooling the stator winding conductors are relatively proportioned so that the relative amounts of ventilating gas passing therethrough maintain the stator core and the stator conductors at substantially the same temperature when the machine is operated near rated load thereby substantially eliminating differential expansion between the conductors and the iron of the stator core.

Ventilating gas is circulated through the machine by blower means 47 comprising a single high pressure blower 48 shown mounted on the shaft 20 at one end of the machine between the end bell 27 and the rotor and stator cores 10, 15. The blower 48 may be a multiple stage centrifugal blower but is preferably a single stage blower having the single impeller whose diameter is greater than the inner diameter of the stator core. Inlet to the blower 48 is located centrally thereof along the shaft 20 and on the side adjacent to the cores 23 and 10 indicated as area "A." Radially aligned with blower 48 is an annular diffuser 49 mounted on the inner periphery of the inner wrapper 25. The ventilating gas discharged by the blower 48 is caused to flow circumferentially through ducts 63 formed by annular member 62 and the other wrapper 24 to be cooled by the cooling means.

Heat in the circulated ventilated gas is absorbed by one or more coolers (not shown) which may be disposed in duct 63. The cooling gas then flows to area "B" at the other end of the machine through opening 58 and some of the cooling gas flows through duct 59 in inner wrapper 25 to the chamber between end bell 27 and the blower 48 indicated as area "C."

The rotor windings (not shown) are also constructed and arranged to provide direct contact between the cooling gas and the winding conductors. Rotor cooling ducts may be arranged to flow from one end of the rotor winding to the other, however, it is preferably arranged to permit entry of the gas in the end winding portions at both ends of the rotor 10 with the cooling gas discharging to the air gap 16 through radially extending holes at the center of the rotor in a known manner.

Means are provided in air gap 16 to restrict the flow of cooling gas from the high gas pressure end of the machine (area B) through the air gap 16 to the blower end of the machine (area A). These means, shown in Fig. 1, comprise an annular member 60 fastened to the end of the stator core and having a close running clearance with rotor retaining ring 61.

According to the invention special cooling means are provided for cooling the core clamping finger plates 53 at the end of the stator at which the hot gas discharges. These cooling means comprise groove 65 in finger plates 53 extending radially of the stator core 23 and extending from substantially the radially outer end of the finger plates 53 to substantially the radially inner end, as shown in Fig. 3. When the finger plates 53 are in position against the lamination 44 at the end of stator core 23, groove 65 and the end core lamination 44 cooperate to form a duct 70, shown in Fig. 2.

Because the grooves 65 do not extend to the radial ends of the finger plates 53, the ducts 70 formed by the grooves 65 and the end lamination 44 are closed at their radial ends. Means are provided for supplying cooling gas to the ducts 70 at the radially outer end thereof and means are provided for permitting the gas to discharge from the radially inner end thereof. The means supplying cooling gas to ducts 70 may comprise an annular duct 66 extending between the stator core 23 and cylinder 35 of inner wrapper 25. As seen in Fig. 6, core stacking bars 45, extending axially of cylinder 35, comprise base portions 68 and key portions 69. The core laminations 44 are stacked on the key portions 69 and when assembled to form core 23, the core 23 cooperates with cylinder 35 to form duct 66 extending axially from one end to the other of the core. Cooling gas is admitted from area B to duct 66 through an annular opening 67, Figs. 1 and 6, between member 40 and the stator core 23.

Along the center portion 42 of cylinder 35 the duct 66 has a cross sectional area determined by the depth of the base 68 of core stacking bar 45 and the depth of the mounting lands 77 on portion 42 as seen in Fig. 7. Fig. 8 shows a means of closing the end of duct 66, shown in Fig. 7, in which a core lamination 44 is shaped to fit around the base portion 68 of stacking bar 45 and extends radially to end portion 41 of cylinder 35.

Duct means 72, shown in Fig. 2, connecting duct 66 and duct 70 are formed by the end laminations 44 of the core 23. The radially extending portion 73 of duct means 72 is formed by slots 74 in laminations 44 as seen in Fig. 4. The axially extending portion of duct means 72 is formed by aligned holes 76 in adjacent laminations 44 as seen in Fig. 5.

The means permitting gas to discharge from duct 70 comprise discharge ducts 78 at the radially inner end of finger plates 53, as seen in Figs. 2 and 3, which connect finger plate ducts 70 to the low pressure portion of the ventilating circuit. Ducts 78 are arranged on the sides of finger plates 53 to discharge gas circumferentially of the stator core 23 to avoid interference with hot gases discharging from the air gap 16. Ducts 78 in adjacent finger plates 53 are staggered so that the gas will discharge freely and the flow from adjacent finger plates 53 will not interfere with each other.

In operation of the turbogenerator at normal speed of rotation, the supercharger or blower develops a pressure differential of at least eight inches of water when hydrogen at atmospheric pressure is the ventilating gas. The blower is a suction type which takes hot gases from area A of Fig. 1 and forces the gas into the duct 63 formed by member 62 and the outer wrapper 24 and thence through the coolers therein. The cooled gas flows to area B at the other end of the machine and to area C between the blower 48 and bell housing 27. From areas B and C the gas flows into the rotor cooling ducts at both ends of the rotor and discharges at the center to return through the air gap 16 to the fan suction in a conventional manner. Cooling gas also flows from end to end through the stator winding cooling ducts and the stator core cooling ducts 57 from area B to area A to return to the suction of the blower 48 for recirculation.

In accordance with the present invention cooling gas also flows into opening 67, Fig. 1, from area B and flows through duct 66 and duct 72 to supply cooling gas to duct 70. The cooling gas is supplied at a high differential pressure. Therefore the cool gas flows through ducts 70 at a high velocity and removes the finger plate heat losses as it flows radially inward and discharges to area A through openings 78, shown in Fig. 3.

The cooling gas will remove some heat from the outer circumference of the core laminations 23 as it passes through duct 66. This flow may be increased by providing orifices (not shown) in core lamination 44 of Fig. 8 and thereby removing greater amount of heat from the core 23. Such an increased flow would also prevent the hydrogen from getting too hot from core heat before it enters the finger plate duct 70.

Other variations or modifications may be made in the embodiment of the invention shown by one skilled in the art without departing from the spirit of the invention or from the scope of the appended claims.

What is claimed is:

1. In a dynamoelectric machine, a housing containing a cooling gas, a laminated stator core having slots containing a winding, said winding including cooling ducts extending axially from one end to the other end in substantially direct contact with the conductors thereof, fan means producing a relatively high differential gas pressure causing said gas to flow through said ducts from a first end to a second end of said machine, means including finger plates at the second end of said machine clamping said stator core in said housing, grooves in said finger plates at said second end of said machine cooperating with the axial end of said core to provide finger plate cooling ducts extending from substantially the radially outer end to substantially the radially inner end of said finger plates, duct means disposed adjacent the outer periphery of said laminated stator core providing cooling gas connecting means extending between said first end of said machine and said finger plate ducts, baffle means in said duct means disposed at said second end of said machine to block and prevent flow of said cooling gas around the radially outward end of said finger plates and thereby direct all of said cooling gas passing through said duct means to flow through said finger plate ducts in a direction toward the radial inner end of said finger plates, and means at the radially inner end of said finger plates connecting said finger plate ducts to said second end of said machine.

2. In a dynamoelectric machine, a housing containing a cooling gas, a laminated stator core having slots containing a winding, said winding including cooling ducts extending axially from one end to the other and in substantially direct contact with the conductors thereof, fan means producing a relatively high differential gas pressure causing said gas to flow through said ducts from a first end to a second end of said machine, means including finger plates at the second end of said machine clamping said stator core in said housing, grooves in said finger plates at said second end of said machine cooperating with the axial end of said core to provide finger plate cooling ducts extending from substantially the radially outer end to substantially the radially inner end of said finger plates, duct means disposed adjacent the outer periphery of said laminated stator core providing cooling gas connecting means extending between said first end of said machine and said finger plate ducts, baffle means in said duct means disposed at second end of said machine to block and prevent flow of said cooling gas around the radially outward end of said finger plates and thereby direct all of said cooling gas passing through said duct means to flow through said finger plate ducts in a direction toward the radial inner end of said finger plates, and discharge ducts provided by the means at the radially inner end of said finger plates arranged to discharge said cooling gas from said finger plates circumferentially to said second end of said machine, said discharge ducts in adjacent finger plates being radially staggered to permit free discharge of said gas.

3. In a dynamoelectric machine, a housing containing a cooling gas, an inner housing wrapper, a stator core comprising laminations stacked within said inner wrapper, said laminated stator core having slots containing a winding, said winding having cooling ducts extending axially from one end to the other end in substantially direct contact with the conductors thereof, fan means producing a high differential gas pressure causing said gas to flow through said cooling ducts from a first end to a second end of said machine, means including finger plates at the second end of said machine clamping said core in said housing, grooves in said finger plates at said second end of said machine cooperating with the axial end of said stator core to provide cooling ducts extending from substantially the radially outer end to substantially the radially inner end of said finger plates, an annular duct formed by the outer periphery of said core and said inner wrapper, baffle means in said annular duct at said second end of said machine, duct means provided by the core laminations at said second end of said machine connecting said annular duct to said finger plate cooling ducts, and discharged ducts provided by the radially inner end of said finger plates arranged to discharge said cooling gas from said finger plate ducts circumferentially of said machine, said discharge ducts in adjacent finger plates being radially staggered to permit free discharge of said gas.

4. In a dynamoelectric machine, a housing containing a cooling gas, an inner housing wrapper, a stator comprising laminations stacked within said inner wrapper, said laminated stator core having slots containing a winding, said winding having cooling ducts extending axially from a first end to a second end of said machine and in substantially direct contact with the conductors thereof, fan means at said second end of said machine producing a high differential gas pressure duct means between said housing and said inner wrapper conducting said gas from said second end to said first end of said machine to cause said gas to flow through said duct from said first end to said second end of said machine, means including finger plates at the second end of said machine clamping said core in said housing, grooves in said finger plates at said second end of said machine cooperating with the axial end of said stator core to provide cooling ducts extending from substantially the radially outer end to substantially the radially inner end of said finger plates, an annular duct formed by the outer periphery of said core and said inner wrapper, baffle means in said annular duct at said second end of said machine, duct means provided by the core laminations at said second end of said machine connecting said annular duct to said finger plate cooling ducts, and discharge ducts provided by the radially inner end of said finger plates arranged to discharge said cooling gas from said finger plate ducts circumferentially of said machine, said discharge ducts in adjacent finger plates being radially staggered to permit free discharge of said gas.

References Cited in the file of this patent
UNITED STATES PATENTS

| | | |
|---|---|---|
| 1,685,054 | Hibbard | Sept. 18, 1928 |
| 2,761,987 | Beckwith | Sept. 4, 1956 |